(12) United States Patent
Sakamoto

(10) Patent No.: US 6,741,006 B2
(45) Date of Patent: May 25, 2004

(54) MAGNET TYPE STEPPING MOTOR

(75) Inventor: Masafumi Sakamoto, Gunma (JP)

(73) Assignee: Japan Servo Co., Ltd., Gunma (JP)

( * ) Notice: Subject to any disclaimer, the term of this patent is extended or adjusted under 35 U.S.C. 154(b) by 0 days.

(21) Appl. No.: 09/851,922

(22) Filed: May 10, 2001

(65) Prior Publication Data

US 2001/0017493 A1 Aug. 30, 2001

Related U.S. Application Data

(62) Division of application No. 09/640,144, filed on Aug. 16, 2000, now Pat. No. 6,281,615, which is a division of application No. 09/437,020, filed on Nov. 9, 1999, now Pat. No. 6,121,712, which is a division of application No. 09/056,190, filed on Apr. 6, 1998, now Pat. No. 6,028,377.

(30) Foreign Application Priority Data

Apr. 7, 1997 (JP) ............................................. 9-102422

(51) Int. Cl.$^7$ ................................................ H02K 1/12
(52) U.S. Cl. ..................... 310/254; 310/179; 310/49 R; 310/258; 310/261; 310/263; 310/268
(58) Field of Search ............................... 310/49 R, 179, 310/185, 254, 258, 261, 263, 268, 138, 685, 686, 696, 701

(56) References Cited

U.S. PATENT DOCUMENTS

| | | | | |
|---|---|---|---|---|
| 3,678,352 A | * | 7/1972 | Bedford | 318/138 |
| 4,742,258 A | * | 5/1988 | Earle et al. | 310/156.53 |
| 4,795,936 A | * | 1/1989 | Crosetto et al. | 310/218 X |
| 5,292,284 A | * | 3/1994 | Denk et al. | 464/29 |
| 5,386,161 A | * | 1/1995 | Sakamoto | 310/49 R |
| 5,532,531 A | * | 7/1996 | Sakamoto | 310/49 R |
| 5,545,938 A | * | 8/1996 | Mecrow | 310/156 |
| 5,652,493 A | * | 7/1997 | Hendershot, Jr. | 318/701 |
| 5,654,601 A | * | 8/1997 | Fulton | 310/168 |
| 5,804,941 A | * | 9/1998 | Ray | 318/569 |
| 6,028,377 A | * | 2/2000 | Sakamoto | 310/49 R |
| 6,055,957 A | * | 5/2000 | Hasegawa et al. | 123/305 |
| 6,121,712 A | * | 9/2000 | Sakamoto | 310/254 |
| 6,281,615 B1 | * | 8/2001 | Sakamoto | 310/254 |

* cited by examiner

Primary Examiner—Burton S. Mullins
Assistant Examiner—Judson H. Jones
(74) Attorney, Agent, or Firm—Patterson, Thuente, Skaar & Christensen, P.A.

(57) ABSTRACT

A magnet type stepping motor which has (1) a stator with three-phase stator windings, and 6m pieces of stator main pole arranged side by side, where m is an integer and $\geq 1$, the stator windings of one phase are wound around every two stator main poles among the 6m pieces of the stator main pole, wherein when the stator windings of one phase are excited with a direct current, m pieces of N pole and M pieces of S pole are formed alternately on the 6m pieces of stator main pole, and (2) a rotor of a cylindrical permanent magnet magnetized in the circumferential direction to form Z/2 pieces of N pole and Z/2 pieces of S pole alternately, where Z is the number of rotor poles.

2 Claims, 12 Drawing Sheets

U  V  W

|   | T1 | T2 | T3 | T4 | T5 | T6 |
|---|----|----|----|----|----|----|
| 1 | O  |    |    | O  |    |    |
| 2 |    |    |    | O  | O  |    |
| 3 |    | O  |    |    | O  |    |
| 4 |    | O  | O  |    |    |    |
| 5 |    |    | O  |    |    | O  |
| 6 | O  |    |    |    |    | O  |

MAGNET TYPE STEPPING MOTOR

CROSS-REFERENCE TO RELATED APPLICATION

This application is a divisional application of Ser. No. 09/640,144, filed Aug. 16, 2000, now U.S. Pat. No. 6,281,615 B1, issued Aug. 28, 2001, which is a divisional application of Ser. No. 09/437,020, filed Nov. 9, 1999, now U.S. Pat. No. 6,121,712, issued Sep. 19, 2000, which is a divisional application of U.S. Ser. No. 09/056,190, filed Apr. 6, 1998, now U.S. Pat. No. 6,028,377, issued Feb. 22, 2000.

BACKGROUND OF THE INVENTION

1. Field of the Invention

This invention relates to a stepping motor and, more particularly, relates to an improvement of a stepping motor wherein stator windings thereof can be used in a three-phase driving and a two-phase driving.

2. Description of the Prior Art

In the most of conventional hybrid type stepping motors shown in FIGS. 4 and 5 or the conventional permanent magnet type stepping motors, two-phase windings are used.

FIG. 4 shows a vertically sectional side view of a conventional hybrid type stepping motor 10.

FIG. 5 is a vertically sectional front view, taken along lines 5—5 of FIG. 4.

In FIGS. 4 and 5, a reference numeral 1 denotes a stator housing, 2 denotes a stator core, 3-1–3-8 denote stator windings, and 4 and 4' denote front and back brackets, respectively. The stator core 2 has main poles 2-1–2-8. Reference numeral 2-10 denotes pole teeth formed on the inner peripheral surface of each of the main poles 2-1–2-8.

Stator windings 3-1–3-8 are wound around the main poles 2-1–2-8, respectively. The stator core 2 and the stator windings 3-1–3-8 form a stator S.

In FIG. 4, reference numerals 5 and 5' denote bearings, 6 denotes a rotor shaft, 7 and 8 denote rotary magnetic poles, 7-10 and 8-10 in FIG. 5 denote pole teeth formed on the outer peripheral surfaces of the rotor magnetic poles 7 and 8, respectively. The pole teeth 7-10 and 8-10 are deviated in the circumferential direction of said rotor magnetic poles by ½ pitch of the pole teeth from each other.

A rotor R is formed of said rotary shaft 6, rotary magnetic poles 7 and 8 and a permanent magnet 9 held between said two rotary magnetic poles 7 and 8.

Such rotor R is called a hybrid type rotor and forms a part of conventional two-phase hybrid type stepping motor 10.

One of the important factors showing the abilities of the stepping motor is a step angle θs which is normally determined by a phase number P of stator windings or a pole tooth number Zt formed on each rotor magnetic pole and expressed by $$\theta s = 180°/(P \cdot Zt) \quad (1)$$

The step angle θs expressed by the formula (1) is proper to the stepping motor, and becomes small if the phase number P or the pole tooth number Zt becomes large.

The step angle θs of a conventional two-phase stepping motor can be expressed by θs 180°/(2·Zt) and, accordingly, it is very difficult technically to manufacture a two-phase stepping motor having a very small step angle, because if the pole tooth number Zt is larger, the width of the rotor pole tooth becomes smaller.

Further, the two-phase hybrid type stepping motor makes large oscillation and noise.

Such defects can be obviated if the number of the stator main poles is increased to enhance the magnetic valance. However, no two-phase stepping motor of the main magnetic pole number other than eight or the multiple thereof can be obtained.

In the conventional stepping motor having the hybrid type rotor shown in FIGS. 4 and 5, if the number of the stator main poles is 6, the rotor tooth number becomes 6n+5 or 6n+1, where n is an integer and ≧1, so that the rotor tooth number becomes an odd number.

Accordingly, the one-phase windings are wound around the main poles separated 180° from each other, so that if the one-phase windings are excited, the two rotor magnetic poles holding the permanent magnet therebetween are magnetized in the opposite polarities. As a result, one of the rotor magnetic poles is pulled in the upward direction, whereas the other of the rotor magnetic poles is pulled in the downward direction, and, accordingly, the rotor shaft is received a force couple normal to the axis of the rotor shaft, so that an oscillation and noise are generated.

Further, in the conventional permanent magnet type stepping motor, the main magnetic poles on which one-phase windings are wound are magnetized in the same polarity, as shown in U.S. Pat. No. 5,386,161, so that a sufficient magnetic path cannot be formed In case that the windings of one phase are excited, because no different polarities are formed on the main poles on which the one-phase windings are wound.

Accordingly, it is necessary to magnetize in the opposite polarity the main poles on which another one-phase windings are wound, and to form a magnetic path between the main poles of opposite polarities.

In this manner, a two-phase or multiple-phase excitation has to be adopted in practice.

If the phase number P of the stator windings is increased to four or five, however, the number of switches in the driving circuit is also increased.

This results in an expensive and complicated circuit.

SUMMARY OF THE INVENTION

An object of the present invention is to solve the problems mentioned above with respect to the permanent magnet type stepping motor or the hybrid type stepping motor, and to provide a three-phase permanent magnet type stepping motor of smaller step angle which can be driven by the one-phase excitation, and a two-phase permanent magnet type and hybrid type stepping motor of small oscillation and noise.

Another object of the present Invention is to provide a three-phase permanent magnet type stepping motor comprising (1) a stator having three-phase stator windings, and 6m pieces of stator main pole arranged side by side, where m is an integer and ≧1, the stator windings of one phase being wound around every two stator main poles among the 6m pieces of the stator main pole, wherein when the stator windings of one phase are excited with a direct current, m pieces of N pole and m pieces of S pole are formed alternately on the 6m pieces of stator main pole, and 2) a rotor of a cylindrical permanent magnet magnetized in the circumferential direction so as to form Z/2 pieces of N pole and Z/2 pieces of S pole, where Z is the number of rotor poles.

The number of rotor poles is set to m·(12n±2) preferably, where n is an integer and ≧1, and when n is not smaller than two, a plurality of pole teeth are formed on each of the stator main poles.

A further object of the present invention is to provide a two-phase permanent magnet type stepping motor comprising:

(1) a stator having two-phase stator windings, and 12 pieces of stator main pole arranged side by side, the stator windings of one phase being wound around every one stator main poles among the 12 pieces of the stator main pole, wherein when the stator windings of one phase are excited with a direct current, 3 pieces of N pole and 3 pieces of S pole are formed on the 12 pieces of stator main pole, and (2) a rotor of a cylindrical permanent magnet magnetized in the circumferential direction so as to form Z/2 pieces of N pole and Z/2 pieces S pole alternately, where Z is the number of rotor poles.

The number of rotor poles is set to 24n±6, where n is an integer and ≧1, and when n is not smaller than two, a plurality of pole teeth are formed on each of the stator main poles.

Yet another object of the present invention is to provide a two-phase hybrid type stepping motor comprising (1) a stator having two-phase stator windings, and 12 pieces of stator main pole arranged side by side, the stator windings of one phase being wound around every one stator main poles among the 12 pieces of the stator main pole, wherein when the stator windings of one phase are excited with a direct current, 3 pieces of N pole and 3 pieces of S pole are formed alternately on the 12 pieces of stator main pole, and (2) a hybrid type rotor consisting of two rotor elements of magnetic material each formed on the circumference thereof with a plurality of pole teeth and of a permanent magnet magnetized in the axial direction held between said two cylindrical rotor elements.

The number of rotor pole teeth is 12n±3, where n is an integer and ≧1, and when n is not smaller than two, a plurality of pole teeth are formed on each of the stator main poles.

Yet further object of the present invention is to provide a three-phase hybrid type stepping motor comprising (1) a stator having three-phase stator windings of U, V, and W, and 12 pieces of stator main pole arranged side by side and extending radially form an annular stator york, k pieces of pole tooth being formed on the tip end of each stator main pole, where k is an integer and ≧2, the stator windings of one phase being wound around every two stator main poles among the 12 pieces of the stator main pole, wherein when the stator windings of one phase are excited with a direct current, 2 pieces of N pole and 2 pieces of S pole are formed on the 4 pieces of stator main pole, and (2) a hybrid type inner rotor consisting of two magnetic rotor elements each having a plurality of pole teeth on the outer peripheral surface thereof and a permanent magnet held by the two magnetic rotor elements therebetween, the one magnetic rotor element being deviated from the other in the peripheral direction by ½ pitch of the pole teeth, wherein the number of the pole tooth is 12k±2.

In order to reduce the oscillation, it is preferable that the pitch of stator magnetic pole teeth is set to a value not larger than the pitch of rotor pole teeth.

The present invention can be applied on the outer rotor type stepping motor. In this case, the permanent magnet may be provided on the stator. In case of the windings of star connection, the winding ends of the windings of U, V and W phases are connected together and the winding direction of the windings of one phase is reversed to that of the remaining phases.

Still another object of the present invention is to provide a three-phase annular winding cascade craw-pole type stepping motor and a driving method thereof, the stepping motor comprising (1) a rotor consisting of a cylindrical magnet magnetized in the circumferential direction so as to form M pieces of N pole and M pieces S pole alternately, where M is an integer and ≧2, and (2) a stator having annular three stator units arranged in the axial direction of the rotor concentrically with the rotor axis, each of said stator unit consisting of two opposite stator cores having craw poles extending axially on the Inner peripheral surface thereof, and of one of three stator windings of U, V and W phases held between said two stator cores, said windings of U, V and W phases being arranged in this order in the axial direction, said craw poles being separated by 180°/M from one another and magnetized by said stator winding in opposite polarities alternately, said three stator windings being connected to form a star or delta connection, adjacent craw poles magnetized by the stator windings of U phase and V phase are deviated by 60°/M from each other in the circumferential direction, and adjacent craw poles magnetized by the stator windings of V phase and W phase are deviated by 60°/M from each other in the circumferential direction, said annular stator windings being excited so that a magnetic flux generated by the annular stator windings of one phase in the axial direction becomes always opposite to that by annular stator windings of the other phase, in case of two phase exciting driving.

Still another object of the present invention is to provide a three-phase annular winding cascade claw-type stepping motor and a driving method thereof, the stepping motor comprising:

a rotor consisting of a cylindrical magnet magnetized in the circumferential direction so as to form M pieces of N pole and M pieces S pole alternately, where M is an integer and ≧2, and a stator having annular three stator elements arranged in the axial direction of the rotor concentrically with the rotor axis, each stator element consisting of two opposite stator cores having claw poles extending axially from the inner peripheral surface thereof, and of three stator windings of U, V and W phases held between the two stator cores, the windings of U, V and W phases being arranged in this order in the axial direction, the claw poles being separated by 180° from one another and magnetized by said stator windings in opposite polarities alternately, the three stator windings being connected to form a star or delta connection, adjacent claw poles magnetized by the stator windings of U phase and V phase are deviated by 120°/M from each other in the circumferential direction, and adjacent claw poles magnetized by the stator windings of V phase and W phase are deviated by 120°/M from each other in the circumferential direction, the annular stator windings being excited so that a magnetic flux generated by annular stator windings of one phase in the axial direction becomes always the same to that generated by the other annular stator windings adjacent to the annular stator windings of the one phase, but a magnetic flux generated by the annular stator windings in the axial direction becomes always opposite to that generated by the annular stator windings which is not adjacent to the annular stator windings of the one phase, in case of two phase exciting driving.

These and other objects and features of the present Invention will become apparent from the following description in conjunction with the attached drawings.

BRIEF DESCRIPTION OF THE DRAWINGS

FIG. 14(A)–13(F) are other explanation views of the driving sequence of the cascade craw-pole type motor according to the present invention.

DESCRIPTION OF THE PREFERRED EMBODIMENTS

A three-phase six-pole permanent magnet type stepping motor 20 according to a first embodiment of this invention will be explained with reference to FIG. 1.

Figure 1:
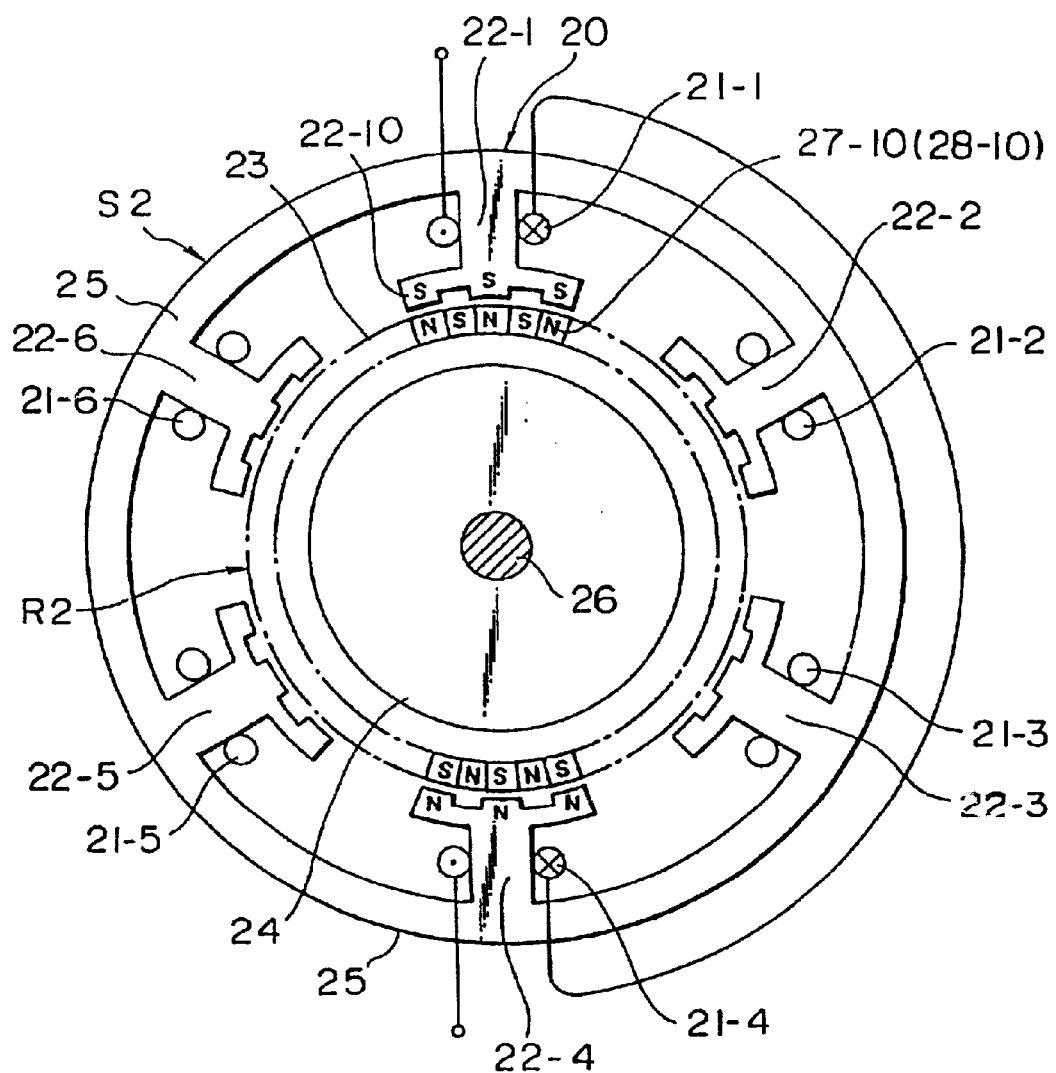
FIG. 1 is a vertically sectional front view of a three-phase permanent magnet type stepping motor according to a first embodiment of the present invention.

The permanent magnet type stepping motor 20 shown in FIG. 1 has a stator S2 and a rotor R2. The stator S2 comprises an annular stator yoke 25 and 6m pieces of stator main magnetic pole 22-1–22-6 equidistantly apart from one another and extending inwardly radially from the inner peripheral surface of the annular stator yoke 25, where m is an integer and $\geq 1$. Three-phase stator windings 21-1–21-6 are wound around the stator main magnetic poles. On the outer peripheral surface of the rotor R2, twenty five N pole 27-10 and twenty five S poles 28-10 are magnetized alternately.

The inner peripheral surfaces of the stator main poles 22-1–22-6 are faced the outer peripheral surface of the rotor R2 with a small gap therebetween. Each stator main pole has three pole teeth 22-10 on the inner peripheral surface thereof.

In the present invention the number Z of the rotor poles can be expressed by $Z = m \cdot (12n \pm 2)$, where n is an integer and $\geq 1$.

In the stepping motor 20 shown in FIG. 1, m is 1, n is 4 and Z is 50.

Figure 4:
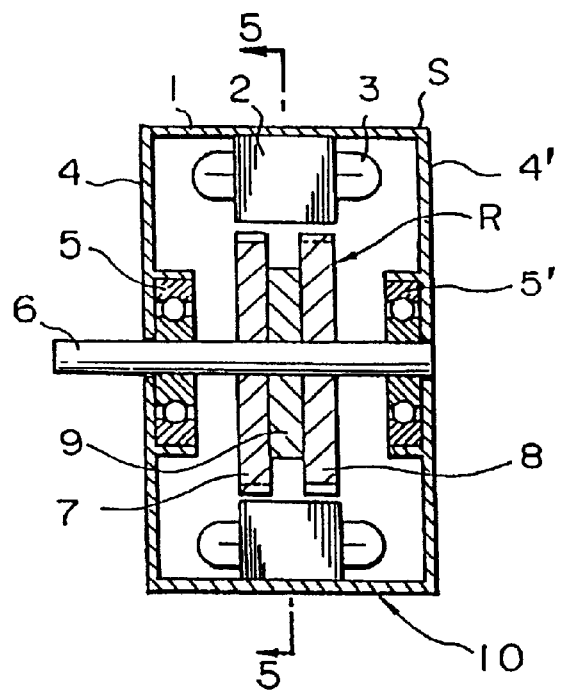
FIG. 4 is a vertical sectional side view of a conventional two-phase hybrid type stepping motor.

The rotor R2 of the permanent magnet type stepping motor 20 of the present invention consists of a cylindrical permanent magnet 23 as shown in FIG. 1 different from the rotor R of the conventional two-phase stepping motor 10 shown in FIG. 4. However, it is preferable to provide a back yoke 24 supported by a rotor shaft 26. Among the stator windings 21-1–21-6 wound around the stator main poles 22-1–22-6, the stator windings 21-1 and 21-4, wound around the stator main poles 22-1 and 22-4 correspond one phase, and when the one phase windings 21-1 and 21-4 are excited with a direct current, the stator main poles 22-1 and 22-4 are magnetized in the opposite polarities to each other.

According to the permanent magnet type stepping motor 20 of the present invention, it is possible to drive by one phase exciting, circuit because the different polarities of the same numbers are always formed on the stator main poles corresponding to one phase windings, on the contrary to the conventional permanent magnet type stepping motor, shown in U.S. Pat. No. 5,386,161.

Specifically, in FIG. 1, a magnetic flux emanated from the N pole of the cylindrical permanent magnet 23 is entered into the main pole 22-1 of S pole to cross the winding 21-1, then entered into the main pole 22-4 through the annular yoke 25 of the stator S2 to cross the windings 21-4, then entered into the S pole of the cylindrical permanent magnet 23, and back to the original N pole through the back yoke 24 to close the magnetic path.

Thus, the one phase exciting driving is attained.

When the windings of 21-2 and 21-5 of second phase are excited while interrupting the current applied on the stator windings 21-1 and 21-4, the rotor R2 is rotated with a step angle θs corresponding to an angular deviation, between the pole tooth 22-10 of the stator main poles 22-2 and 22-5 and the poles of the permanent magnet rotor.

Similarly, if the windings 21-3 and 21-6 wound around the main poles 22-3 and 22-6 of third-phase are excited, the rotor is rotated with the step angle θs, thus the most simple one-phase exciting driving is realized.

An excellent features of this embodiment of the first invention other than said features mentioned above will be clarified by the comparison against the conventional stepping motor.

Specifically, in the present invention shown in FIG. 1, an attracting force in the radial direction generated by the pole teeth 22-10 of the excited stator main pole 22-1 and applied to the rotor R2 consisting of the cylindrical permanent magnet 23 and an attracting force in the radial direction generated by the pole teeth 22-10 of the excited stator main pole 22-4 and applied to the rotor R2 consisting of the cylindrical permanent magnet 23 are cancelled to each other, because both forces are the same with each other in intensity, but different in direction from each other, so that no force in the radial direction is applied to the bearings supporting the rotor shaft 26 and thus the oscillation and the noise are reduced.

As stated above, according to the present invention, six-poles hybrid type stepping motor of low oscillation and noise can be realized.

The reason why the number Z of rotor poles can be expressed by m·(12n±2) in the permanent type stepping motor in the first embodiment of the present invention will be explained hereunder.

The step angle θs of the stepping motor is expressed by said formula (1). In the stepping motor 20 of the present invention, the phase number P of the stator windings is three, and the number of pole teeth Zt of N or S of the ring magnet rotor R2 is one half of the number Z of rotor poles, so that the step angle θs can be expressed by $$\theta s = 180°/\{3 \cdot Z \cdot (½)\} = 120°/Z \quad (2)$$

The stator main poles are arranged equidistantly apart by 360°/6m from one another, and the rotor magnetic pole nearest the stator main poles are equidistantly apart by $\{360°/(Z/2)\}\cdot n$ from one another, so that the step angle θs is expressed by $$\theta s = \pm[(360°/6m) - 360°n/\{Z \cdot (½)\}] \quad (3)$$

By the solution of the formulas (2) and (3), such a formula, Z=m·(12n±2) can be obtained. In case that n is not less than 2, the torque of the stepping motor can be increased if a plurality of pole teeth are formed on the tip end of each stator main pole.

Further, in case that the phase number of stator windings is three, the step angle θs can be reduced if the number Zt of rotor pole teeth is the same with that in case of the phase number is two as shown in the formula (1), so that the resolution of the stepping motor of the present invention can be increased.

A second embodiment of the twelve-pole two-phase permanent magnet type stepping motor 30 according to the present invention will be explained with reference to FIG. 2.

A rotor R3 is similar in construction to the rotor R2 shown in FIG. 1 and consisting of a cylindrical permanent magnet 33 having a plurality of N poles and S poles alternately on the outer periphery thereof.

A stator S3 has twelve main poles 32-1–32-12 arranged equidistantly apart from one another, and two-phase windings 31-1–31-12 are wound around the stator main poles. One-phase windings are wound around every one of the main poles among the twelve main poles 32-1–32-12, and three of N poles and three of S poles are formed alternately on the six main poles when the one-phase windings are excited with a direct current.

Figure 2:
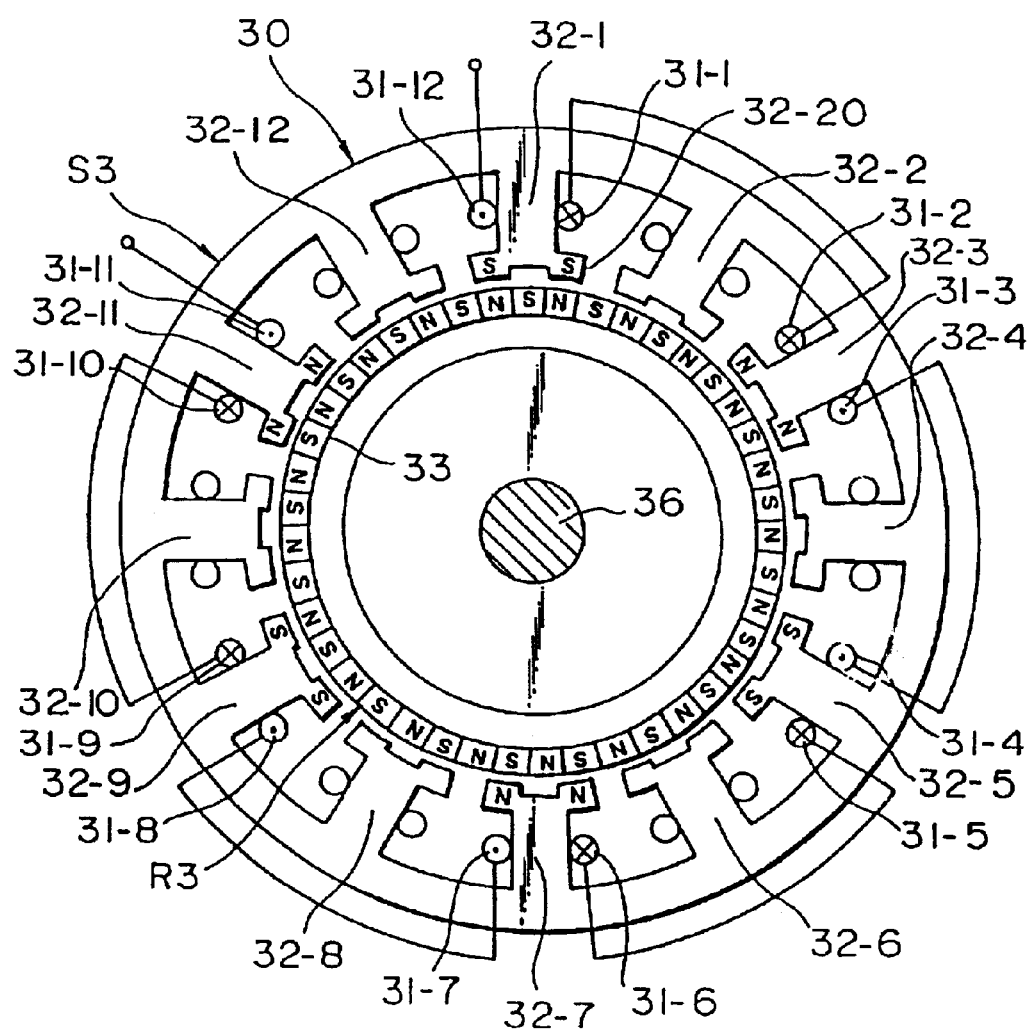
FIG. 2 is a vertically sectional front view of a two-phase twelve-pole permanent magnet type stepping motor according to a second embodiment of the present invention.

FIG. 2 shows polarities with respect to only one-phase windings. In the stepping motor shown in FIG. 2 forces acting on the rotor R3 in the radial direction are always cancelled with each other similar to that shown in FIG. 1.

Figure 5:
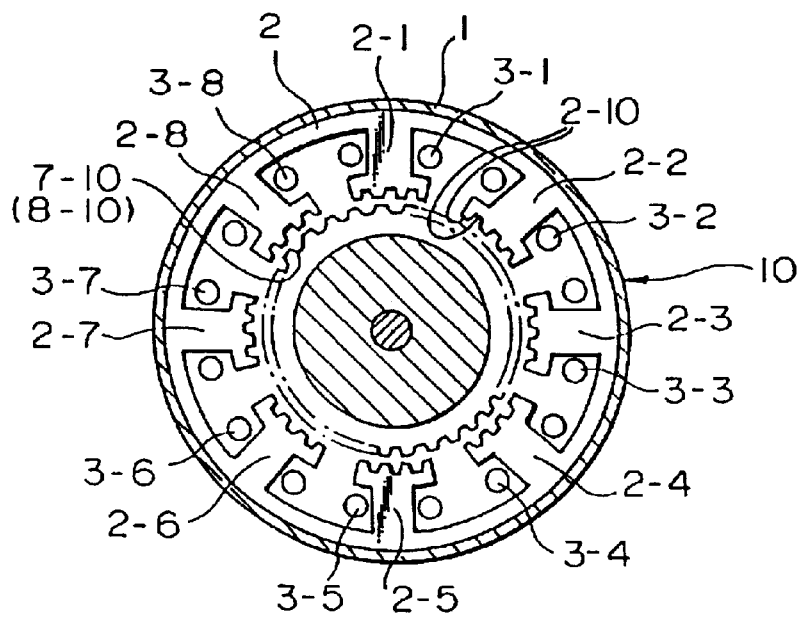
FIG. 5 is a vertically sectional front view, taken along lines 5—5 of FIG. 4.

Even in the two-phase stepping motor, the oscillation and the noise of the stepping motor can be reduced if the number of the stator main poles is large. The number of the main poles of the stator S3 according to the present invention is twelve different from the conventional two-phase stepping motor shown in FIGS. 4 and 5 of which number of main poles is eight, so that the oscillation and the noise can be reduced.

In this case, such a formula, Z=24n±6 can be obtained as in the case of the formulas (1) to (3), where n is an integer and ≧1. It is preferable to provide a plurality of pole teeth 32-20 on the tip end of each of the twelve main poles 31-1–31-12 when n is ≧2.

Figure 3:
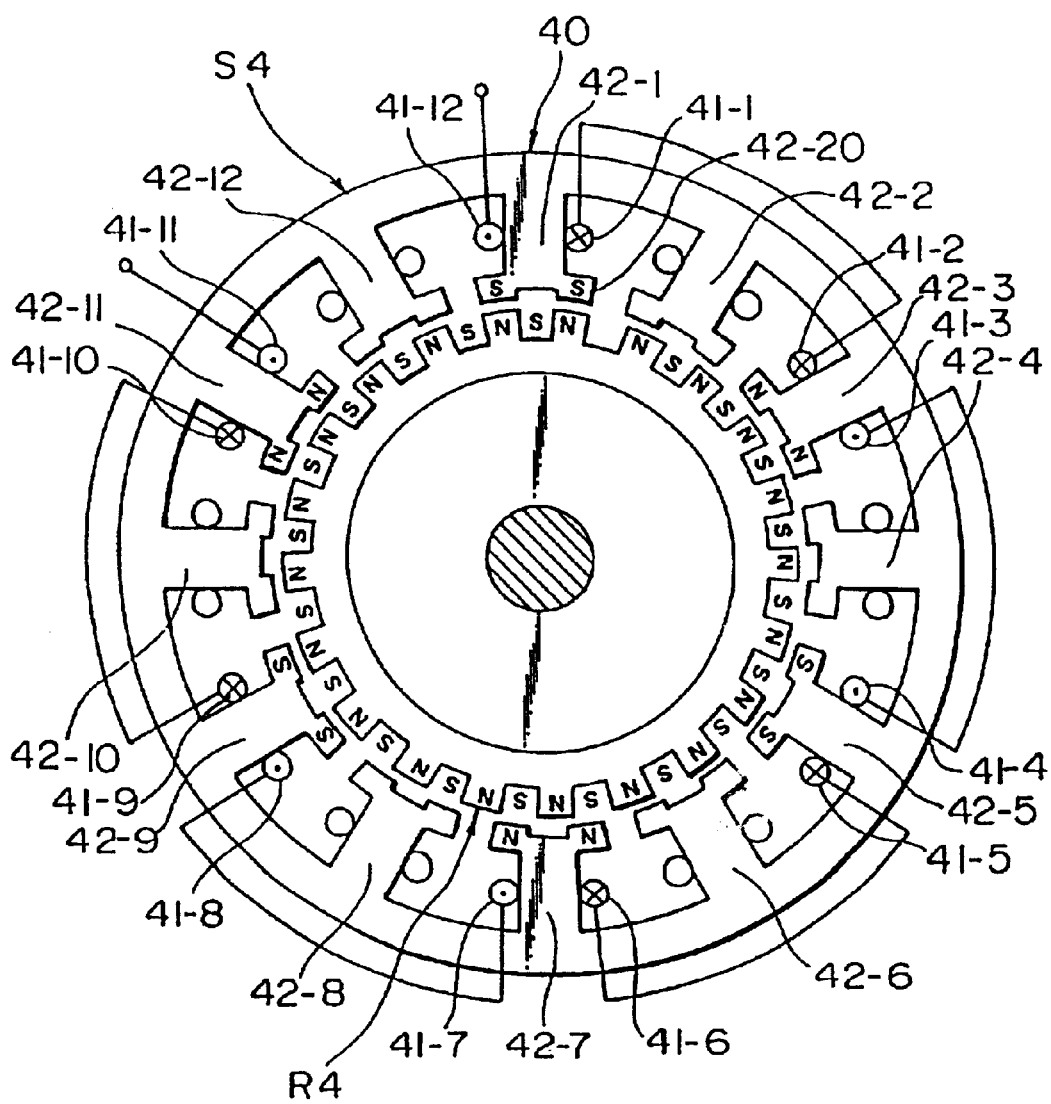
FIG. 3 is a vertically sectional front view of a two-phase twelve-pole hybrid type stepping motor according to a third embodiment of the present invention.

A third embodiment of the twelve poles two-phase hybrid type stepping motor 40 according to the present invention will be explained with reference to FIG. 3.

A stator S4 is similar in construction to the stator S3 of the second embodiment of the present invention, but a rotor R4 is of hybrid type.

The oscillation and the noise of the hybrid type stepping motor become larger than that shown in FIG. 2.

However, the number of main poles of this embodiment according to the present Invention becomes larger than that of the conventional stepping motor shown in FIG. 4 of which number of the main poles is eight, so that the electromagnetic forces acted on the rotor R4 are balanced.

Three stator main poles 42-1, 42-5 and 42-9 arranged with a pitch of 120° are the same polarity and attract the rotor magnetic poles of opposite polarity, so that the total of vectors of the radial forces becomes zero and is expressed by $$\cos(0°) - 2 \cdot \cos(30°) = 0$$

The merit of the hybrid type motor is to reduce the step angle θs compared with that using a cylindrical permanent magnet 23 of which outer periphery is magnetized as shown in FIG. 2, because it is difficult to form a number of poles having a desired magnetic force on the outer peripheral surface of the cylindrical permanent magnet 23.

The number Zt of rotor pole teeth can be expressed by Zt=12n±3, where n is an integer and ≧1. It is preferable to provide a plurality of pole teeth 42-20 on the tip end of each of the twelve main poles 42-1–42-12 when n is ≧2.

In each of the above preferable embodiments, the stator main poles are arranged in the circumferential direction equidistantly apart from one another. Specifically, in the first embodiment, the number Z of stator magnetic poles is expressed by Z=m·(12n±2). In the second embodiment, Z is expressed by Z=24n±6.

In the third embodiment, the number Zt of rotor pole teeth is expressed by Zt=12n±3.

As stated above, it is preferable to form the stator main poles symmetrically in order to enhance the characteristic feature, such as, the precision of the step angle. However, the stepping motor of the present invention can practically be used in various ways even if the stator main poles are formed asymmetrically, though the property thereof is somewhat deteriorated.

A fourth embodiment of the twelve-pole three-phase hybrid type stepping motor according to the present invention will be explained with reference to FIG. 6.

This stepping motor comprises a stator S5 and a hybrid type inner rotor R5. The stator S5 has three-phase stator windings of U, V and W, and 12 pieces of stator main pole arranged side by side, k pieces of pole tooth being formed on the tip end of each stator main pole, where k is an integer and ≧2, the stator windings of one phase being wound around every two stator main poles 52-1, 52-4, 52-7, 52-10 among the 12 pieces of the stator main pole 52-1–52-12, wherein when the stator windings of one phase are excited with a direct current, 2 pieces of N pole and 2 pieces of S pole are formed on the 12 pieces of stator main pole 52-1 and 52-7, and 52-4 and 52-10, respectively. The hybrid type inner rotor consists of two magnetic rotor elements each having Zt pieces of pole tooth on the outer periphery thereof, and of a permanent magnet magnetized in the axial direction and held by the two magnetic rotor elements therebetween, the one magnetic rotor element being deviated from the other in the peripheral direction by ½ pitch of the pole teeth, wherein the number of the pole tooth is 12k±2.

Figure 6:
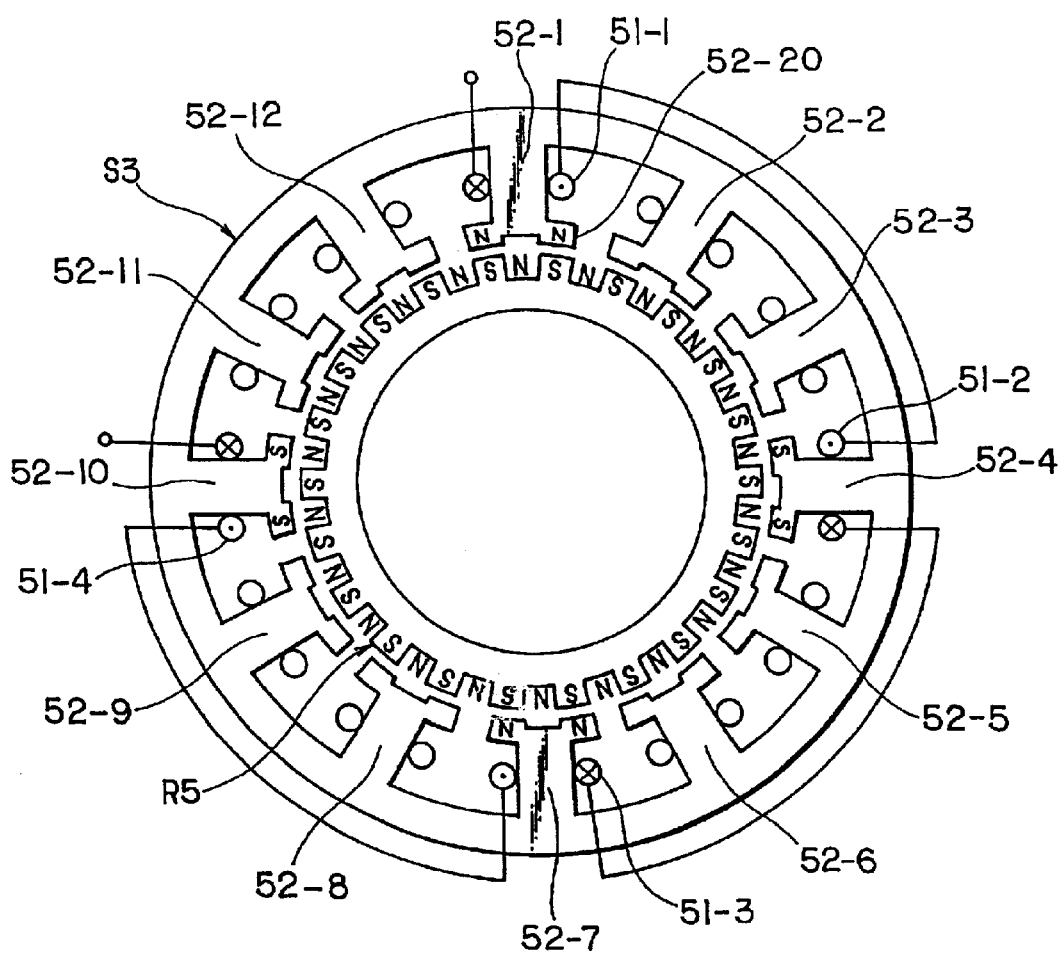
FIG. 6 is a vertically sectional front view of a three-phase permanent magnet type stepping motor according to a fourth embodiment of the present invention.

The number Zt of rotor pole teeth is expressed by Zt=12k±2, and in the embodiment shown in FIG. 6, k is two and Zt is twenty-two, so that the basic step angle becomes about 2.72°, because one rotation of the rotor is obtained by 1320(22×6) steps.

In this case, a path of magnetic flux is formed so that magnetic fluxes emanated from the N poles of the back rotor element is entered into the stator main poles 52-4 and 52-10, and entered into the S poles of the front rotor element through the rotor main poles 52-1 and 52-7. As stated above, the path of magnetic flux is completed in one phase and accordingly is not affected by the other path of other phases.

In case that k is four and Zt is fifty, one rotation of the rotor is obtained by 300 (50×6) steps, so that the step angle becomes 1.2°.

In this case, however, it is preferable to set smaller the pitch of k pieces of stator pole tooth than the pitch of the rotor magnetic poles in order to reduce the oscillation.

Specifically, if the pitch of four stator pole teeth is set smaller than the pitch of the rotor magnetic poles of 7.2°, the higher harmonic components of the magnetic flux are reduced and accordingly the oscillation is reduced. Further, the width of the open slot is increased, so that the insertion of the winding thereto becomes easy. This construction can be applied on both of inner rotor type and of outer rotor type.

If the stepping motor shown in FIG. 6 is driven in the star connection, the three-terminal driving is realized, so that the number of the driving transistors is six and the circuit becomes simple. In this case, the winding ends of the windings of U, V and W phases are connected together, and the wiring direction or the winding direction of the windings of V phase is set opposite to that of the windings of U and W phases as shown in FIG. 7.

In other cases the wiring direction or the winding direction of the windings of W phase is set opposite to that of the windings of U and V phases, or the windings of U phase is set opposite to that of the windings of V and W phases.

This method can be realized without limiting the number of the pole teeth of the twelve stator main poles or the number of the rotor magnetic poles in the fourth embodiment of the stepping motor shown in FIG. 6.

Figure 7:
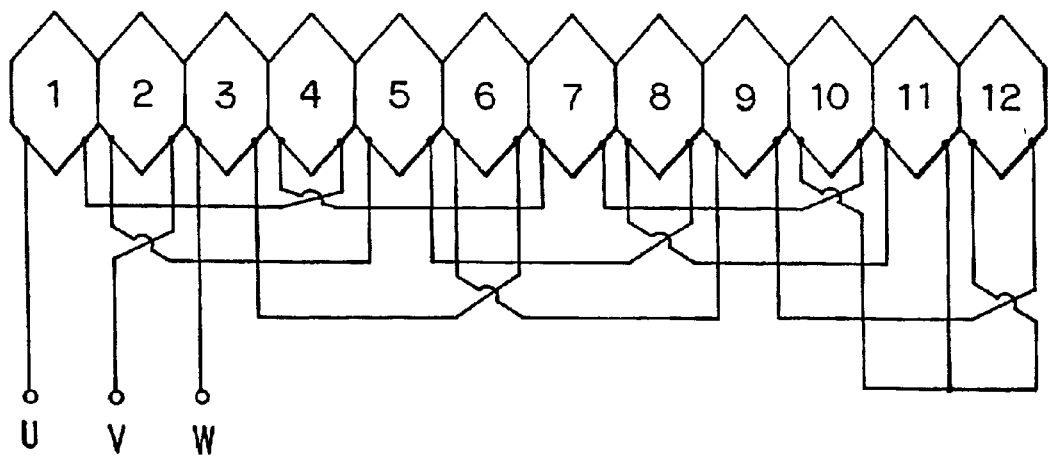
FIG. 7 shows a wiring circuit for the motor shown in FIG. 6.

FIG. 7. shows the star connection. However, the above method can be realized by setting the wiring direction or winding direction of the windings of V phase opposite to that of the windings of U and W phases, even in case of the delta connection.

Figure 8:
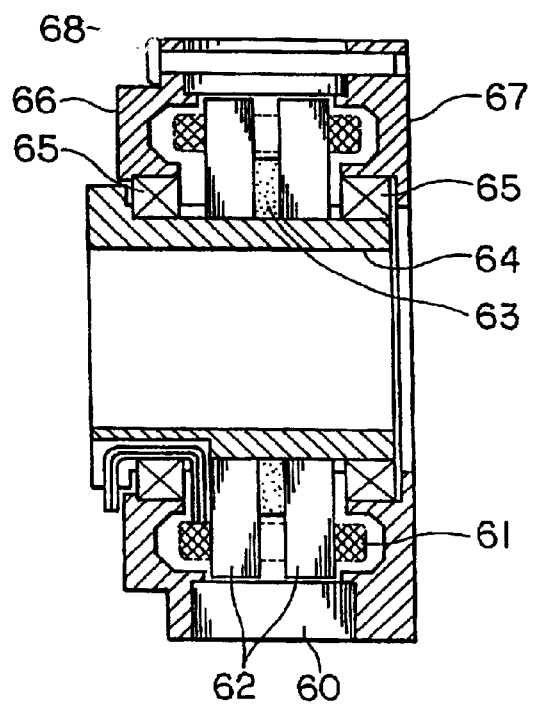
FIG. 8 is a vertically sectional side view of a three-phase permanent magnet type stepping motor according to a fifth embodiment of the present invention.

A modification of the fourth embodiment will be explained. An outer rotor type motor wherein a permanent magnet is provided on the stator, not on the rotor is publicly known. If the magnetic circuit as shown in FIG. 6 is applied to this motor, the motor of low oscillation and high torque can be realized. The stepping motor wherein the permanent magnet is provided on the stator is shown in FIG. 8. In FIG. 8, a reference numeral 60 denotes a rotor iron core having Zt pieces of pole tooth on the inner peripheral surface thereof, where Zt=12±2 and n is an integer and ≧1. Reference numeral 62 denotes a stator iron core having twelve main poles, each main pole having a plurality of pole teeth. The twelve main poles are extending radially outwardly from the outer peripheral surface of the stator iron core 62. The stator iron core 62 consists of two splitted stator elements and a permanent magnet 63 held therebetween in the stepping motor shown in FIG. 8, wherein in the stepping motor shown in FIG. 6, the twelve stator main poles are extending radially inwardly from the inner peripheral surface of the stator. Windings 61 are wound around the two splitted stator main poles as like as that shown in FIG. 6. In this case, the number of the pole teeth of the stator main poles is not limited to k, for example, because each stator main poles are extending radially outwardly.

The permanent magnet 63 may be shaped as a circle, or similar in configuration to the stator having twelve main poles which can generate a larger magnetic flux. A reference numeral 64 denotes a stationary shaft holding the stator iron core 62. A reference numeral 65 is a bearing, and 66 and 67 denote brackets for holding the rotor iron core 60 so as to form a gap between the inner peripheral surface of the rotor iron core 60 and the outer peripheral surface of the stator pole teeth. A reference numeral 68 is a screw to fasten together the rotor iron core 60, and brackets 66 and 67. The merits of the motor of this type are that a high torque can be obtained because the rotor can be made larger in diameter than that of the inner rotor type, the smaller step angle can be obtained because Zt is increased in proportion to the diameter of the rotor, and the stationary shaft 64 can be formed tubular as shown in FIG. 8.

A fifth embodiment of the present invention will be explained with reference to FIGS. 9, 10, 11, 12, 13(A)–13 (F), and 14(A)–14(F).

Figure 9:
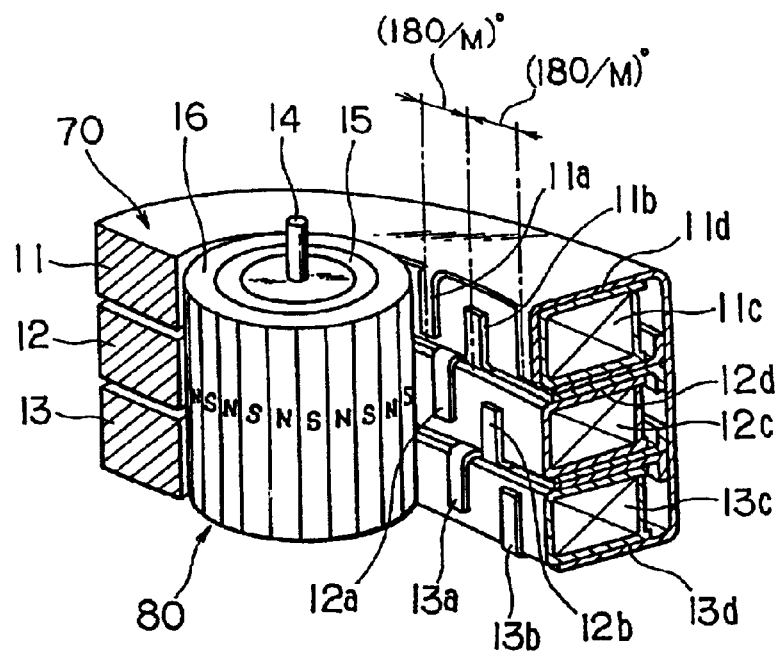
FIG. 9 is a perspective extended view of a three-phase cascade claw-type stepping motor according to a sixth embodiment of the present invention.
Figures 11, 12:
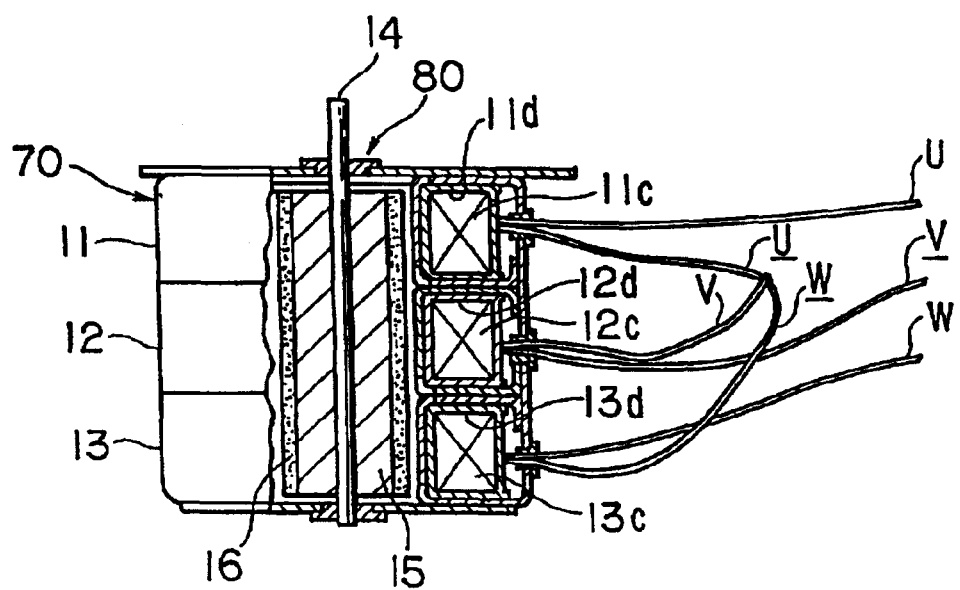
FIG. 11 is a table showing the driving sequence of the motor.
FIG. 12 is a vertically sectional side view of a three-phase cascade craw-pole type motor shown in FIG. 9 with wiring connections.
Figure 13A:
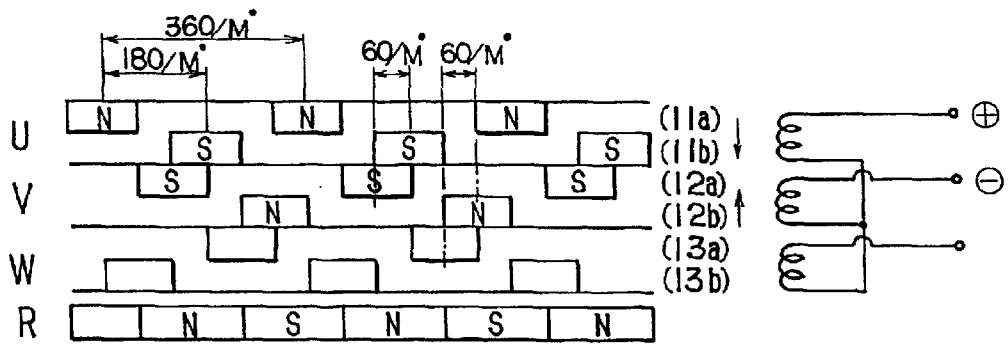
FIGS. 13(A)–13(F) are explanation views of the driving sequence of the cascade craw-pole type motor according to the present invention.
Figure 13B:
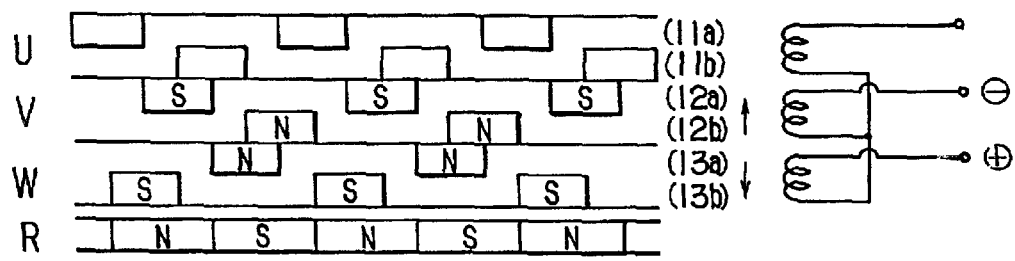
Figure 13C:
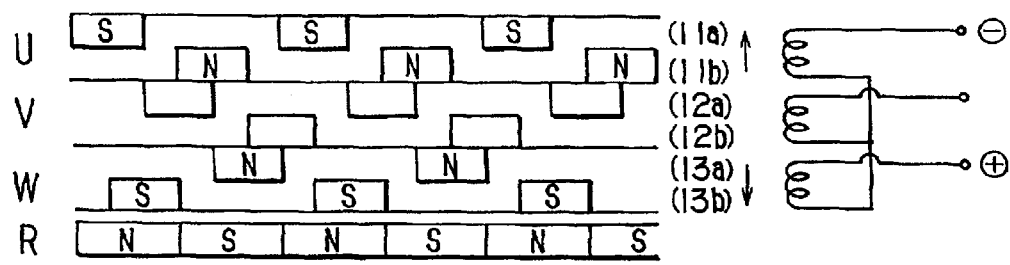
Figure 13D:
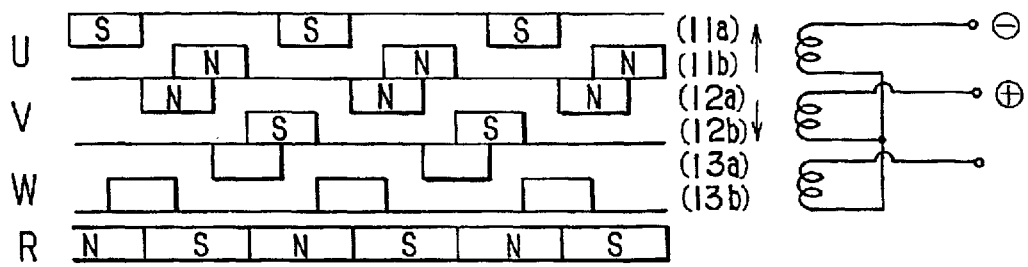
Figure 13E:
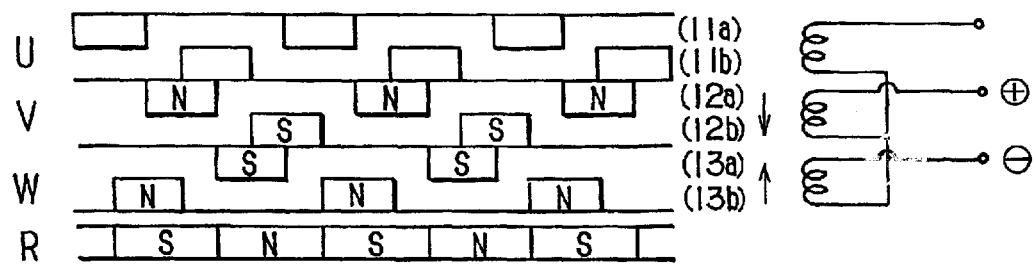
Figure 13F:
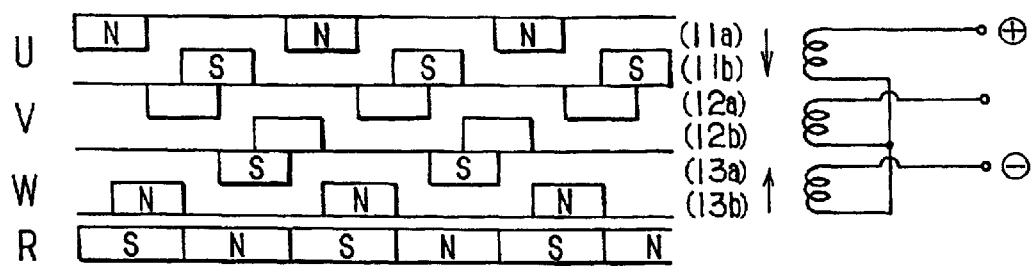
Figure 14A:
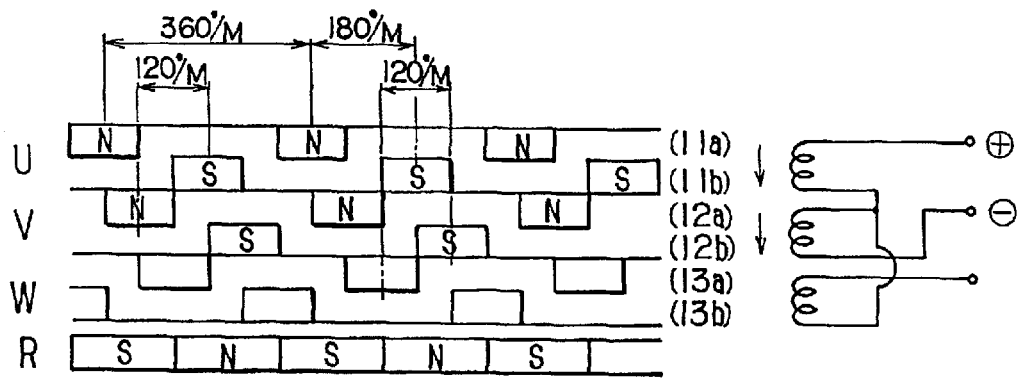
Figure 14B:
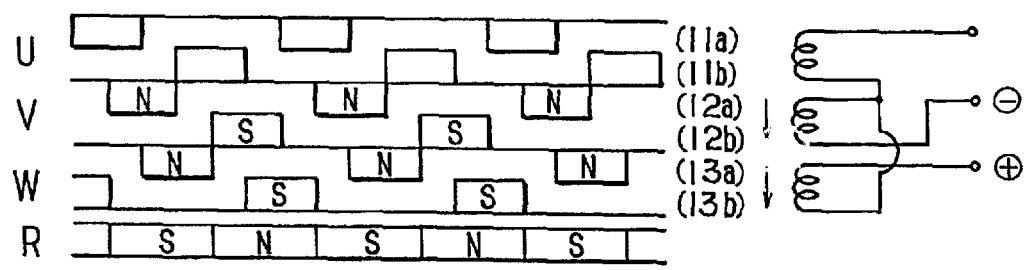
Figure 14C:
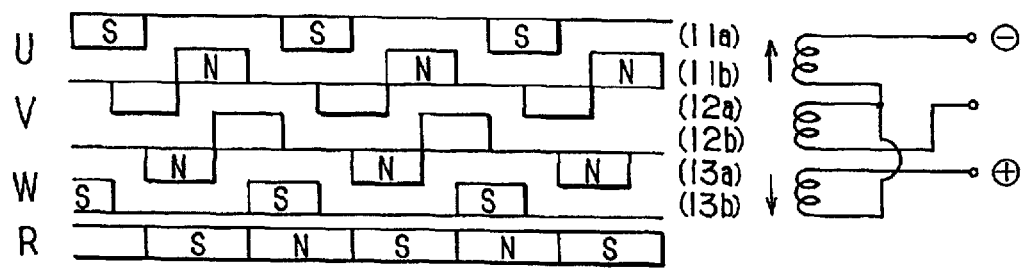
Figure 14D:
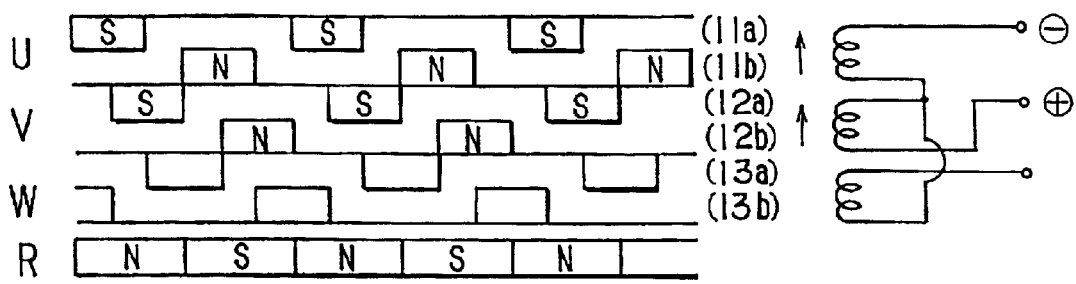
Figure 14E:
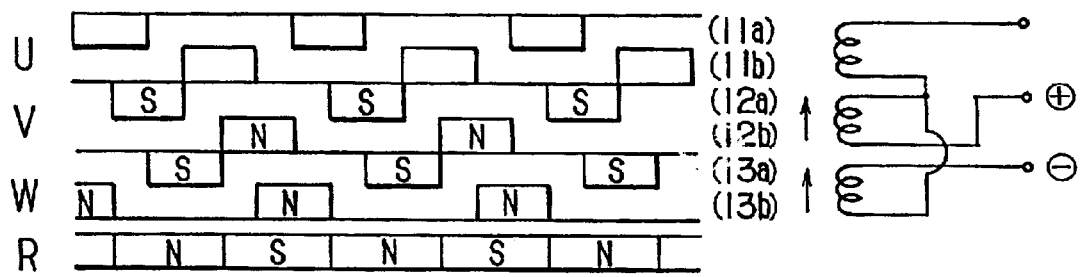
Figure 14F:
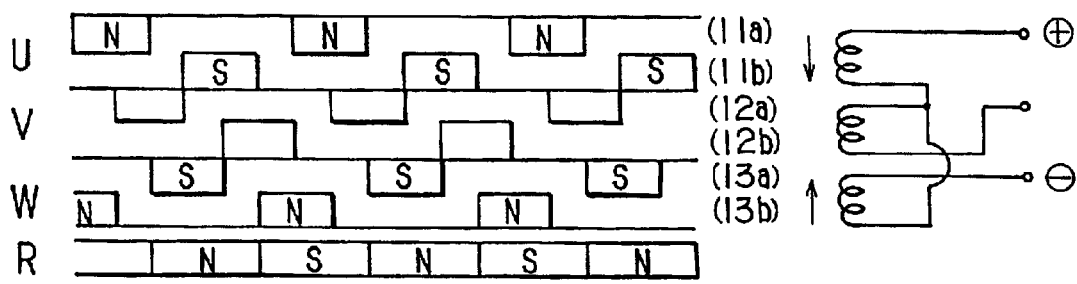

A three-phase cascade claw-type stepping motor as shown in FIG. 9 and a three-phase permanent magnet type stepping motor having piled stators as shown in FIG. 12 are economical.

FIG. 9 is an extended view of a stator 70 and a rotor 80 having on the outer peripheral surface thereof M pieces of N pole and M pieces S pole alternately. The stator 70 consists of first, second and third stator units 11, 12 and 13 corresponding to windings 11c, 12c and 13c of U, V and W phases, respectively. The first stator unit 11 has M pieces of claw pole 11a and M pieces of claw pole 11b in the form of comb extending axially, claw poles 11a and 11b being separated by 180°/M from one another on the inner peripheral surface of the stator 70, and the winding 11c wound around an inside bobbin 11d. The second stator unit 12 has M pieces of claw pole 12a and M pieces of claw pole 12b, and the winding 12c wound around an inside bobbin 12d similar to that of the first stator unit 11. The third stator unit 13 has M pieces of claw pole 13a and M pieces of claw pole 13b, and the winding 13c wound around an inside bobbin 13d similar to that of the first stator unit 11. The rotor 80 consists of a rotor shaft 14, a core 15 and a cylindrical permanent magnet 16 magnetized in the circumferential direction so as to form M pieces of N pole and M pieces of S pole alternately.

In such three-phase stepping motor, a bipolar circuit to be excited with an alternating current by using a transistor array is used for each phase. The bipolar circuit is excited by a H bridge consisting of four transistors connected to two lead wires of each of the three annular windings, so that twelve transistors are required for three phases.

On the contrary, according to the present invention, such a three-phase stepping motor can be driven by six transistors.

In the stepping motor according to the present invention, the claw pole 11b magnetized by the stator winding of U phase is deviated by 60°/M in the circumferential direction from the claw pole 12a magnetized by the stator winding of V phase, adjacent to the winding of U phase, and the claw pole 12b magnetized by the stator winding of V phase is deviated by 60°/M in the circumferential direction from the claw pole 13a magnetized by the stator winding of W phase, the claw pole 11b being adjacent to claw pole 12a, and claw pole 12b being adjacent to claw pole 13a.

Figure 10:
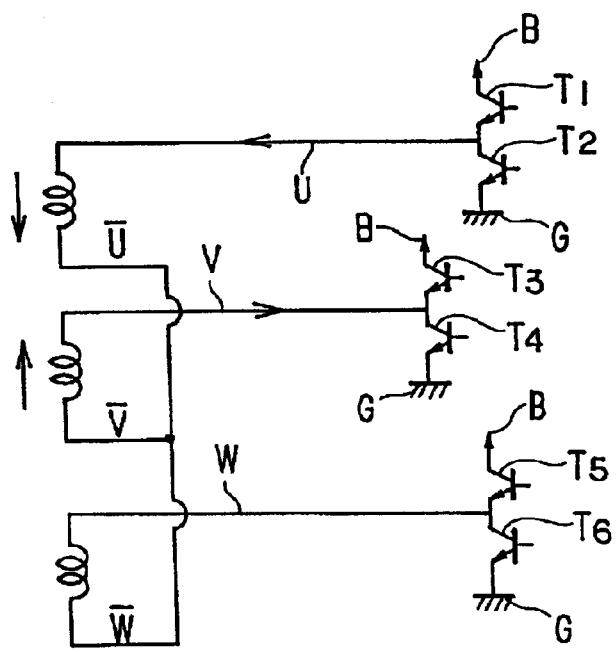
FIG. 10 shows a driving circuit for the motor of the present invention.

The three stator windings are arranged in the axial direction and connected to form a star or delta connection. The annular stator windings are excited so that a magnetic flux generated by the auunlar stator windings of one phase in the axial direction becomes always opposite to that by annular stator windings of the other phase, in case of two phase exciting driving. FIG. 10 shows an example of the star connection wherein reference numerals T1 to T6 denote transistors, B is a (+) terminal of the power source and G is a (−) terminal of the power source.

The transistors T1 to T6 are driven according to (1) to (6) of the table shown in FIG. 11. When the transistors T1 and T4 are driven according to (1) of the table shown in FIG. 11, the windings U and V are excited and magnetic fluxes are generated in the reverse direction as shown by arrows in FIG. 10.

FIGS. 13(A)–13(F) show the relations between the stator and the rotor when the transistors T1–T6 are driven according to the (1) to (6) of the table shown in FIG. 11. The rotor is rotated with the step angle of 60°/M. As apparent from FIGS. 13(A)–13(F), the magnetic fluxes generated by the windings of two phases are always opposite to each other as shown by arrows in case of the two-phase driving. In the other embodiment of the present invention, the claw pole 11b magnetized by the stator winding of U phase is deviated by 120°/M in the circumferential direction from the claw pole 12a magnetized by the stator winding of V phase, adjacent to the winding of U phase, and the claw pole 12b magnetized by the stator winding of V phase is deviated by 120°/M in the circumferential direction from the claw pole 13a magnetized by the stator winding of W phase.

The three stator windings are connected to form a star or delta connection as shown in FIG. 12.

Specifically, the winding direction or the wiring direction of the windings of only V phase is reversed. The relations between the stator and the rotor are shown in FIGS. 14(A)–14(F), if the windings of U, V and W phases are connected as shown in FIG. 10 and driven according to the (1) to (6) of the table shown in FIG. 11, the rotor 80 rotates with the step angle of 60/M.

It is apparent that the magnetic flux generated by annular stator windings of one phase such as U phase in the axial direction becomes always the same to that by the other annular stator windings of the other phase such as V phase adjacent to said one annular stator winding, but a magnetic flux generated by the annular stator windings of one phase such as U phase in the axial direction becomes always opposite to that by the annular stator windings of the other phase such as W phase which is not adjacent to said annular stator windings, in case of two phase exciting driving.

In the fifth embodiment of the present invention, if a center tap is formed on each of three annular windings and the windings are driven by a unipolar circuit so as to reverse the direction of the generated magnetic flux in the two-phase exciting, and to flow the current in one direction, that the motor can be driven by only six transistors, though the number of lead wires is increased to 7 or 9, on the contrary to in the case of bipolar driving.

The effect of the permanent magnet type stepping motor of the present invention will be explained hereunder.

(1) According to the present invention, the step angle becomes small compared with the conventional two-phase stepping motor, so that the resolution of the stepping motor can be enhanced, if the number of phases of the stator windings is three.

(2) One-phase exciting driving can be applied to the three-phase permanent magnet type stepping motor of the present invention.

(3) A two-phase permanent magnet type or hybrid type stepping motor according to the present invention of low oscillation and noise can be realized because a cylindrical permanent magnet rotor is used, or a stator having twelve stator main poles is used compared with the conventional two-phase stepping motor using a stator having eight stator main poles.

(4) A three-phase twelve-main pole hybrid type stepping motor of low oscillation can be obtained because the rotor magnetic paths in the three phases are independent of one another.

Further, the present invention can be applied to a stepping motor using a permanent magnet as a stator.

(5) A three-phase cascade craw-pole type stepping motor which can be driven by six transistors can be realized in order to reduce in manufacturing cost.

It should be understood that many changes and modifications may be made within the scope of the present invention without departing from the spirit thereof. The scope of these changes will become apparent from the attached claims.

What is claimed is:

1. A magnet type stepping motor comprising:
   (1) a stator having three-phase stator windings, and 6 m pieces of stator main pole arranged side by side, where m is an integer and $\geq 1$, the stator windings of one phase being wound around a first stator main pole and every third stator main pole among the 6 m pieces of the stator main pole, wherein when the stator windings of one phase are excited with a direct current, m pieces of N pole and m pieces of S pole are formed alternately on those 6 m pieces of stator main pole that correspond to the excited stator windings, and
   (2) a rotor of a cylindrical permanent magnet magnetized in the circumferential direction so as to form Z/2 pieces of N pole and Z/2 pieces of S pole alternately, where Z is the number of rotor poles, and wherein the number of rotor poles is set to m·(12n±2), where n is an integer and $\geq 1$.

2. A magnet type stepping motor comprising:
   (1) a stator having three-phase stator windings, and 6 m pieces of stator main pole arranged side by side, where m is an integer and $\geq 1$, the stator windings of one phase being wound around a first stator main pole and every third stator main pole among the 6 m pieces of the stator main pole, wherein when the stator windings of one phase are excited with a direct current, m pieces of N pole and m pieces of S pole are formed alternately on those 6 m pieces of stator main pole that correspond to the excited stator windings, and
   (2) a rotor of a cylindrical permanent magnet magnetized in the circumferential direction so as to form Z/2 pieces of N pole and Z/2 pieces of S pole alternately, where Z is the number of rotor poles, and wherein the number of rotor poles is set to m·(12n±2), and a plurality of pole teeth are formed on each of the stator main poles, whore n is an integer and $\geq 2$.

* * * * *